United States Patent
Otsuki et al.

(10) Patent No.: US 6,935,136 B2
(45) Date of Patent: Aug. 30, 2005

(54) METHOD FOR FABRICATION OF OPTICAL ELEMENT HAVING METAL RING

(75) Inventors: Motohiko Otsuki, Miyagi-ken (JP); Kimihiro Kikuchi, Miyagi-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 443 days.

(21) Appl. No.: 10/146,210

(22) Filed: May 14, 2002

(65) Prior Publication Data

US 2002/0184919 A1 Dec. 12, 2002

(30) Foreign Application Priority Data

Jun. 11, 2001 (JP) ........................................ 2001-174994

(51) Int. Cl.⁷ .............................................. C03B 11/08
(52) U.S. Cl. ................................ 65/39; 65/49; 65/59.4; 264/2.7
(58) Field of Search ........................... 425/808; 264/2.7, 264/1.1, 299, 319, 320; 359/819, 811, 830; 65/39, 59.4, 49, 64

(56) References Cited

U.S. PATENT DOCUMENTS 4,302,076 A * 11/1981 Hashimoto .................. 359/830
4,895,585 A    1/1990 Angenent et al.

\* cited by examiner

*Primary Examiner*—Dionne A. Walls
(74) *Attorney, Agent, or Firm*—Beyer, Weaver & Thomas, LLP

(57) ABSTRACT

A metal ring for an optical element that is served to cover a peripheral side surface of a lens and served to fix the lens to a mounting member by means of soldering is provided with a thin-wall sleeve a diameter of which is expanded toward a peripheral direction by means of pressure received from an optical material disposed inside the metal ring to thereby obtain a final peripheral side surface size, a thin-wall portion having an inside periphery near an extension of an inside peripheral surface of the thin-wall sleeve on one of apertures of the thin-wall sleeve, and a holding portion comprising a flange that projects from an edge of the aperture toward the aperture. A metal ring for an optical element, a method for fabrication of the optical element having the metal ring, and an optical element having a metal ring of the invention employ the abovementioned metal ring.

4 Claims, 4 Drawing Sheets

⇩ HEAT MOLDING

METHOD FOR FABRICATION OF OPTICAL ELEMENT HAVING METAL RING

BACKGROUND OF THE INVENTION

1. Field of the Invention

This invention relates to a metal ring for an optical element, a method for fabrication of an optical element having a metal ring, and an optical element having a metal ring, and more particularly relates to a metal ring for an optical element, a method for fabrication of an optical element having a metal ring, and an optical element having a meal ring that are applied to an optical element having optical surfaces on both sides and provided with a peripheral side surface formed as the circumference of the optical element which is to be positioned on a mounting member.

2. Description of the Related Art

It has been proposed to use a V-groove 60 in which an aspherical lets 70 formed of optical glass having a small diameter of, for example, 1 mm as the conventional optical element as shown in FIG. 6, FIG. 7, and FIG. 8. The lens 70 is disposed in the V-groove 64 of a mounting base 62 disposed on a pedestal 61 so as to face to a laser diode 63 mounted on the pedestal 61 provided in a part. In the case of the structure described hereinabove, an optical axis OD of the laser diode 63 can be brought into coincidence with the optical axis of a lens OL easily only by placing and fixing the lens 70 in the V-groove 64 of the mounting base 62 as long as the dimensional precision of the peripheral surface 71 of the lens 70 is maintained precisely, and the adjustment of optical axis is not necessary.

When the abovementioned lens mounting structure is employed, the lens 70 and the mounting base 62 having the V-groove 64 are fixed together with adhesive. However, because handling of adhesive 80 is troublesome and some component evaporated from the adhesive 80 deteriorates the atmosphere around the lens when the adhesive 80 is used for fixing the lens 70, it is desired that the lens is fixed on the mounting base by means of soldering without using adhesive.

To employ soldering for fixing the lens, it is necessary that the peripheral edge of the lens should be metalized. However, if the peripheral edge of a glass lens having a small diameter as described hereinabove is metalized by means of spattering technique, it is difficult to control spattering due to such a small diameter of the lens, and it is necessary to protect the optical functional surface of the lens from being metalized. As the result, it has not been realized to manufacture the desired lens efficiently.

To solve the abovementioned problem, it has been proposed that a thin-wall ring-shaped metal ring member that is solderable is provided on the periphery of a lens.

Such a lens is formed by means of a method in which a glass lens is formed in a metal ring formed of a solderable metal thin-wall. A lens as described hereinabove is formed according to a procedure as described hereunder.

In detail, when an optical element is fabricated by use of a body die for defining the outside configuration and a force plunger for molding a desired optical functional surface by pressing both the incident surface and out-going surface of an optical material charged in the body die in an electromagnetic induction furnace, a metal ring is fixed on the periphery of the lens simultaneously.

In this example, a metal ring having an outside diameter slightly smaller than the inside diameter of the body die is inserted in the body die, an optical glass pellet that is served as the optical material is disposed in the metal ring, the body die is heated with an induction current by use of a coil provided on the outside of the body die so that the optical material is heated to a desired temperature for softening, the optical material is pressed by use of the die in the metal ring to thereby form an optical functional surface having a desired configuration. At that time, simultaneously the metal ring is pressed toward the body die disposed on the outside periphery to enlarge the diameter of the metal ring by means of the pressure applied on the optical material, and these components are cooled to obtain an optical element with a metal ring having a desired outside diameter.

According to the method for fabrication of a lens as described hereinabove, a thin-wall metal ring is disposed on the peripheral edge of a lens and the outside configuration of the metal ring disposed on the peripheral edge of the lens is formed precisely.

In other words, according to the above-mentioned fabrication method, a metal ring disposed on the periphery of the optical material is pressed outward so that the outside diameter is expanded and the metal ring is pressed onto the inside configuration of the body die disposed outside of the metal ring when the optical material disposed in the metal ring is compressed by means of a force plunger, and the optical material is solidified so as to maintain the configuration. As the result, a lens having a desired configuration can be obtained. Because thermal shrinkage of the optical material and metal ring due to cooling can be estimated, a lens having a desired configuration can be obtained by adjusting the dimension of the die previously.

However, if the optical glass is heated in contact with the die material when the optical material is heated, some component in the optical material acts upon the die material due to the heat to cause deterioration of the die material.

To avoid the abovementioned problem, a method has been proposed in which a metal ring having the periphery, which has an aperture formed on the lower end of the metal ring, bent toward inside is used so that the optical material disposed in the metal ring is not in contact with the die material during heating before pressurization.

However, according to the above-mentioned conventional technique, a metal ring is expanded not evenly when the optical material is compressed for forming by use of a die material, which is a problem.

The reason why the problem is caused is that the bent-formed portion for preventing contact formed on the one aperture periphery of the metal ring is less deformable than the other portion, and the metal ring is expanded not evenly.

As the result, a lens having the precise outside peripheral configuration cannot be obtained, and the lens cannot be disposed at a desired position when the lens is fixed on the mounting parts.

SUMMARY OF THE INVENTION

The present invention has been accomplished in view of the abovementioned problem, it is the object of the present invention to provide an optical element having a metal ring, a metal ring for an optical element, and a method for fabrication of an optical element having a metal ring that are excellent in the outside configuration and precision.

The first invention to solve the above-mentioned problem is characterized by providing a metal ring for an optical element that is served to cover a peripheral side surface of the optical element and served to fix the optical element to a mounting member provided with a thin-wall sleeve a diameter of which is expanded toward a peripheral direction by means of pressure received from an optical material disposed inside the metal ring to thereby obtain a final peripheral side surface size, a thin-wall portion having an inside periphery near an extension of the inside peripheral surface of the thin-wall sleeve on one of apertures of the thin-wall sleeve, and a holding portion comprising a flange that projects from an edge of the aperture toward the aperture.

The metal ring for the optical element in accordance with the present invention is characterized in that an edge provided with a polygonal aperture that is circumscribed with an inside peripheral edge of the aperture is formed on the aperture of the metal ring, a portion near a vertex of the polygon is made thin-walled, and a portion between a polygonal side of the edge and the thin-wall sleeve is formed as the flange.

The metal ring for the optical element in accordance with the present invention is characterized in that a softened optical material is disposed inside the metal ring, an optical surface is formed by means of press-working, the diameter of the thin-wall sleeve is expanded, and the peripheral side surface of the optical element is covered.

The metal ring for the optical element in accordance with the present invention is characterized in that an optical element member having an optical surface is fit-pressed inside the metal ring, the diameter of the thin-wall sleeve is expanded to thereby cover the peripheral side surface of the optical element.

The metal ring for the optical element in accordance with the present invention is characterized in that the optical ring is fixed to the mounting member by means of soldering.

The next invention involves a method for fabrication of an optical element having a metal ring and the method in which a metal ring having a diameter slightly smaller than an inside diameter of a body die and an optical material are disposed inside the body die that is served to define a peripheral side surface configuration by which the optical element is positioned, and in which the optical material is pressed by a mold to form a desired optically functional surface and the diameter of the metal ring is expanded toward the body die to obtain the optical element having the metal ring with a desired outside diameter is characterized in that the metal ring disposed inside the body die is provided with a thin-wall sleeve a diameter of which is expanded toward a peripheral direction by means of pressure received from an optical material disposed inside the metal ring to thereby obtain a final peripheral side surface size, a thin-wall portion having an inside periphery near an extension of the inside peripheral surface of the thin-wall sleeve on one of apertures of the thin-wall sleeve, and a holding portion comprising a flange that projects from the edge of the aperture toward the aperture, and the holding portion has a space between the optical material and a mold so that the optical material does not contact the mold when an unsoftened optical material is disposed.

The method for fabrication of the optical element having a metal ring in accordance with the present invention is characterized in that an edge provided with a polygonal aperture that is circumscribed with an inside peripheral edge of the thin-wall sleeve is formed on the aperture of the metal ring, a portion near a vertex of the polygon is made thin-walled, and a portion between a polygonal side and the thin-wall sleeve is formed as the flange.

Furthermore, a method for fabrication of an optical element having a metal ring in accordance with the present invention in which an optical element member having a peripheral side surface configuration by which an optical element is positioned is fit-pressed inside the metal ring having a diameter slightly smaller than the outside diameter of the optical element member, and in which a diameter of the metal ring is expanded is characterized in that the metal ring is provided with a thin-wall sleeve a diameter of which is expanded radially by means of pressure received from an optical material disposed inside the metal ring to thereby obtain a final outside configuration size, a thin-wall portion having an inside periphery near an extension of an inside peripheral surface of the thin-wall sleeve on the one aperture of the thin-wall sleeve, and a holding portion comprising a flange that projects from an edge of the aperture toward the aperture.

Furthermore, the method for fabrication of the optical element having the metal ring in accordance with the present invention is characterized in that an edge provided with a polygonal aperture that is circumscribed with an inside peripheral edge of the thin-wall sleeve is formed on the aperture of the metal ring, a portion near a vertex of the polygon is made thin-walled, and a portion between a polygonal side and the thin-wall sleeve is formed as the flange.

Furthermore, the next invention involves an optical element having a metal ring that has a peripheral side surface covered with a metal ring fixed to a mounting member by means of soldering, the method is characterized in that the metal ring is provided with a thin-wall sleeve a diameter of which is expanded toward a peripheral direction by means of pressure received from an optical material disposed inside the metal ring to thereby obtain a final peripheral side surface size, a thin-wall portion having an inside periphery near an extension of an inside peripheral surface of the thin-wall sleeve on one of apertures of the thin-wall sleeve, and a holding portion comprising a flange that projects from an edge of the aperture toward the aperture.

Furthermore, the optical element having the metal ring in accordance with the present invention is characterized in that an edge provided with a polygonal aperture that is circumscribed with an inside peripheral edge of the thin-wall sleeve is formed on the aperture of the metal ring, a portion near a vertex of the polygon is made thin-walled, and a portion between a polygonal side and the thin-wall sleeve is formed as the flange.

Furthermore, the optical element having the metal ring in accordance with the present invention is characterized in that a softened optical material is disposed inside the metal ring, an optical surface is formed by means of press-working, the diameter of the thin-wall sleeve is expanded, and a peripheral side surface of the optical element is covered.

Furthermore, the optical element having the metal ring in accordance with the present invention is characterized in that an optical element member having an optical surface is fit-pressed inside the metal ring, the diameter of the thin-wall sleeve is expanded to thereby cover the peripheral side surface of the optical element.

A glass lens may be used as the optical element in the respective inventions described hereinabove.

According to the present invention, when the diameter of the metal ring is expanded during molding, because the thin-wall portion is expanded when the diameter of the holding portion is expanded subsequent to the thin-wall sleeve, the diameter expansion resistance of the holding portion is mitigated so that the outside configuration of the holding portion and the portion around the holding portion are prevented from being deformed irregularly, and as the result the precision of the outside size is improved.

Furthermore, in the case of the present invention in which the holding portion having the edge potion provided with a polygonal aperture that is circumscribed to the inside periphery of the aperture is provided, because the portion between the polygonal side and the thin-wall sleeve is deformed more easily than the flange near the thin-wall portion located at the vertex of the polygon when the diameter of the holding portion is expanded, the diameter expansion resistance of the holding portion is mitigated so that the outside configuration of the holding portion and the portion around the holding portion is prevented from being deformed irregularly, and as the result the precision of the outside size is improved.

Furthermore, in the case where a softened optical material is disposed inside the metal ring and the optical surface is formed by means of press working, the metal ring disposed on the periphery is expanded outward by means of the inside pressure when the optical material disposed in the metal ring is compressed by use of a die for forming the optical surface, the metal ring is pressed onto the inside configuration of the body die disposed outside, and a desired configuration is formed. At that time, because the thin-wall portion is expanded easily when the diameter of the holding portion is expanded subsequent to the thin-wall sleeve, the diameter expansion resistance of the holding portion is mitigated so that the outside configuration of the holding portion and the portion around the holding portion are prevented from being deformed irregularly, and as the result the precision of the outside size is improved.

Furthermore, in the case where the optical material member having the optical surface is fit-pressed inside the metal ring and the diameter of the thin-wall sleeve is expanded during fit-pressing, the metal ring disposed on the periphery is expanded outward by means of fit-pressing of the optical element member when the optical element member is fit-pressed inside the metal ring, the metal ring is pressed onto the inside configuration of the body die disposed outside, and thus a desired configuration is formed. At that time, because the thin-wall portion is expanded easily when the diameter of the holding portion is expanded subsequent to the thin-wall sleeve, the diameter expansion resistance of the holding portion is mitigated so that the outside configuration of the holding portion and the portion around the holding portion are prevented from being deformed irregularly, and as the result the precision of the outside size is improved.

DETAILED DESCRIPTION OF THE PREFERRED EMBODIMENTS

Figure 4:
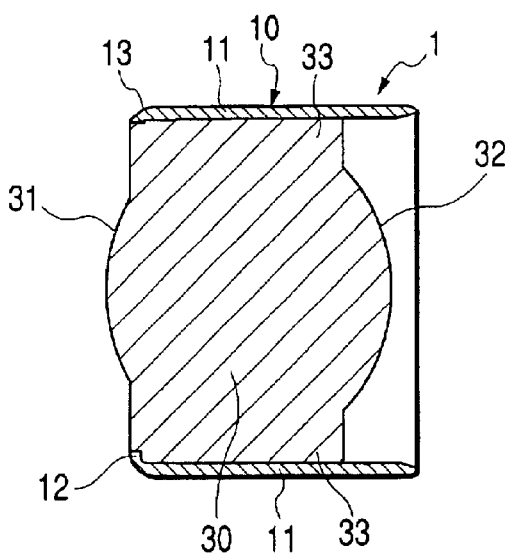
FIG. 4 is a cross sectional view equivalent to the metal ring shown in FIG. 3 showing the aspherical glass lens having the metal ring in accordance with the present invention.

The present invention will be described in detail hereinafter with reference to the drawings. An optical element fabricated in this example is a glass aspherical lens 1 having a metal ring as shown in FIG. 4. The glass aspherical lens 1 having a metal ring has convex surfaces 31 and 32 that are served as the optical surface, and a flange-like peripheral side surface 33 on which a metal ring 10 is attached is formed on the periphery of the optical surface.

Furthermore, a thin-wall metal ring 10 consisting of, for example, metal that is easily soldered and pressed such as alloy of iron and nickel and having a desired plated layer on the surface is fitted on the peripheral side surface 33 of the glass aspherical side surface having the metal ring in accordance with the present example.

The metal ring 10 is provided with a thin-wall sleeve 11 that is to be expanded toward the peripheral direction by means of pressure exerted from the inside so that the final peripheral side surface size is obtained, a thin-wall portion 13 provided on the one aperture of the thin-wall sleeve 11 and having the inside periphery located near the place on the extension of the inside peripheral surface of the thin-wall sleeve 11, and a holding portion 15 provided with a flange 12 that projects from the edge of the aperture toward the aperture.

In the present example, the holding portion 15 has an aperture 14 having octagonal edge lines 16 that are circumscribed to the inside periphery of the thin-wall sleeve 11. In the present example, the place located near the vertex of the aperture 14 is formed as the thin-wall portion 13, and the portion located between the octagonal edge line 16 of the aperture 14 and the thin-wall sleeve 11 is formed as the flange 12.

Next, a method for fabrication of the glass aspherical lens 1 having the metal ring in accordance with the present invention will be described hereunder. In the present example, when the glass aspherical lens 1 having the metal ring is to be fabricated, a desired optical functional surface of the glass aspherical lens 1 having the metal ring is formed by means of a method in which an optical glass pellet 20 is disposed in a body die 21 and pressed vertically by use of a top force 22 and a bottom force 23. At that time, the inside diameter size of the body die 21 is determined with consideration of the outside diameter size of the glass aspherical lens 1 having the metal ring to be fabricated and the shrinkage of the size due to cooling of the optical glass.

Figure 1A:
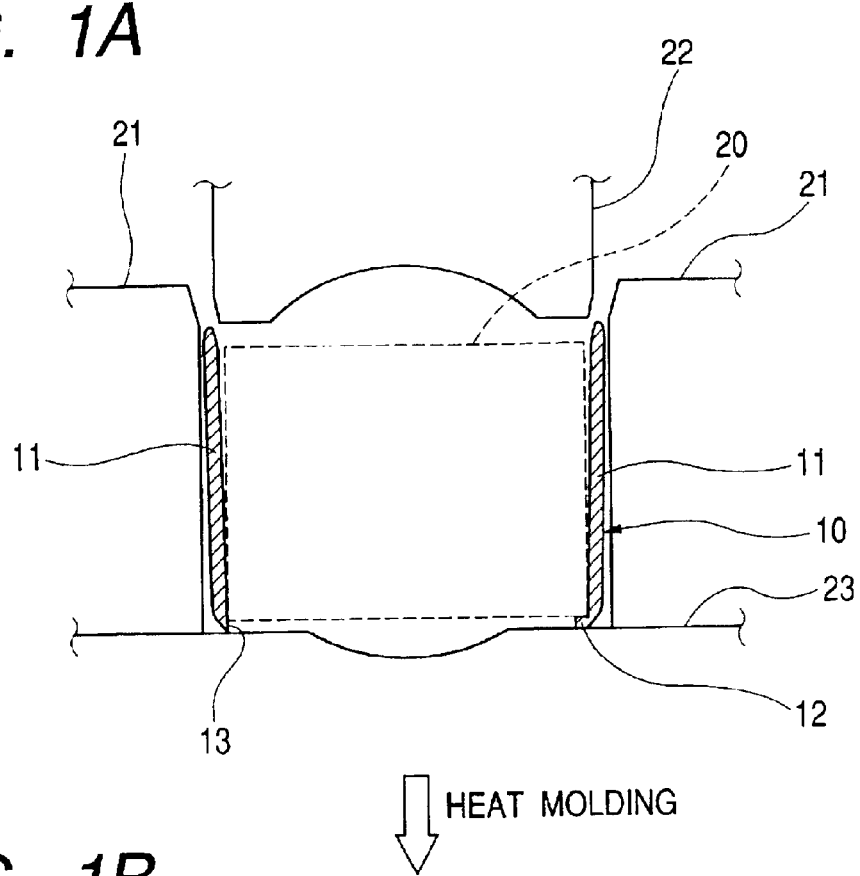
FIG. 1A and FIG. 1B are cross sectional views showing a method for fabrication of an aspherical glass lens having a metal ring in accordance with the present invention.

In the present example, at first the metal ring 10 is disposed in the body die 21 as shown in FIG. 1A. The metal ring 10 has the abovementioned structure, and the outside diameter is slightly smaller than the inside diameter of the body die 21. The metal ring 10 has a small diameter and a thin wall-thickness (for example, the inside diameter is 1.5 mm and the wall-thickness is 0.05 mm) so that the diameter is expanded to the inside diameter of the body die 21 by the pressure exerted from the inside.

Next, an optical glass pellet 20 that is to form a lens as the result of molding is disposed in the metal ring 10. The pellet 20 that is cylindrical is placed on the flange 12 that constitutes the holding portion 15 of the metal ring 10 without direct contact with the bottom force 23 as shown in FIG. 1A.

Therefore, adverse an effect of heating of the optical glass pellet 20 on the bottom force 23 is prevented.

The optical glass pellet 20 consists of optical glass that is used usually for lens, and the optical glass that exhibits the desired optical performance is selected The volume of the pellet 20 should be equal to the volume of a molded lens 30.

Figure 1B:
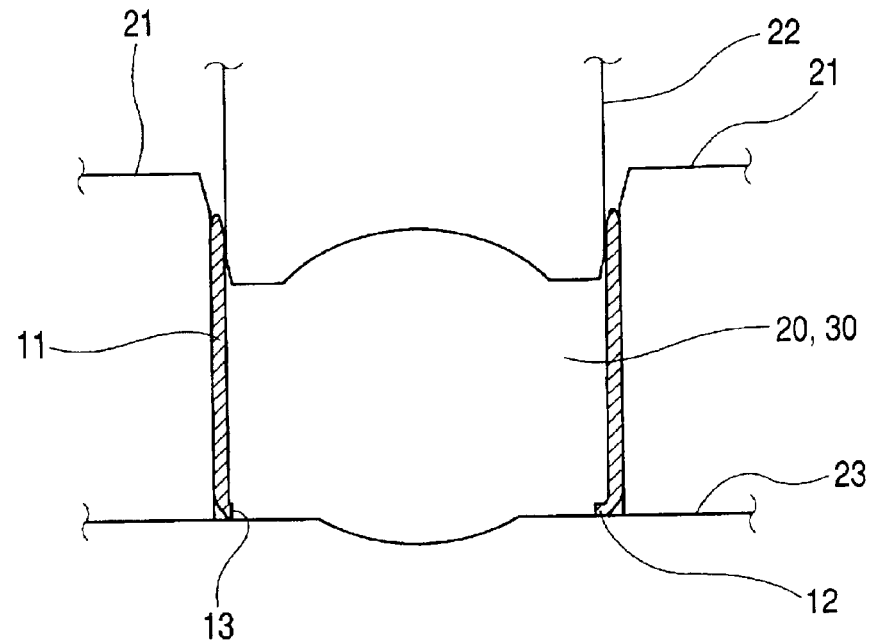
Figure 2:
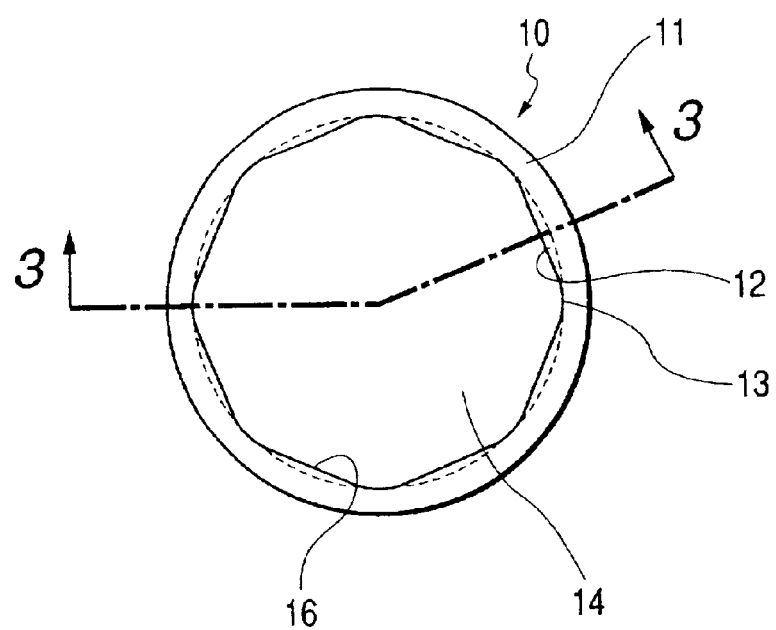
FIG. 2 is a bottom view showing the metal ring for the aspherical glass lens in accordance with the present invention.
Figure 3:
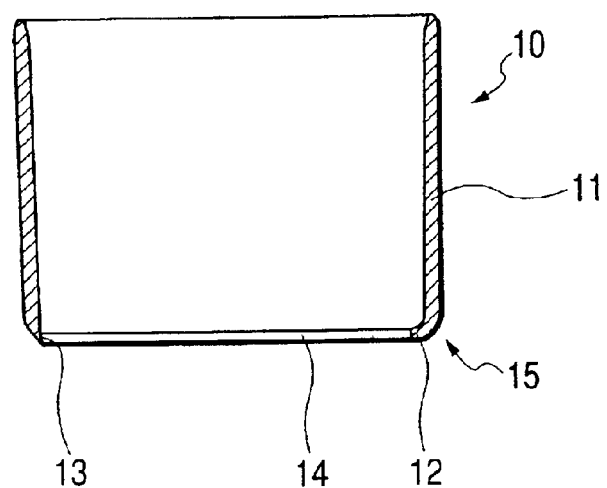
FIG. 3 is a cross sectional view along the line 3—3 in FIG. 2

Next, an alternating current is supplied to a heating coil (not shown in the drawing) disposed around the body die 21 to which the metal ring 10 and the optical glass pellet 20 are being disposed, and the body die 21 is heated by means of induction electromotive force. When the body die 21 is heated, the pellet 20 in the metal ring 10 disposed inside the body die 21 is heated and softened, the top force 22 and the bottom force 23 come closer in this state as shown in FIG. 1B so that the top and bottom surfaces of the pellet 20 disposed inside the metal ring 10 is formed as the desired optical surfaces 31 and 32, and a lens 30 is formed resultantly.

At that time, the pressure arising from the softened pellet 20 is exerted on the metal ring 10 to expand it outward in the circumferential direction, and the final outside size is defined. At that time, the thin-wall sleeve 11 of the metal ring 10 is expanded easily and the size of the thin-wall sleeve 11 is equalized to the inside diameter of the body die 21. Furthermore, though the portion where the flange 12 of the holding portion 15 provided on one aperture of the thin-wall sleeve 11 is unlikely to be deformed by the pressure exerted from the inside, the flange 12 having a desired outside configuration and size can be formed because the thin-wall portion 13 is deformed easily and the holding portion 15 is deformed easily as a whole.

Because the metal ring 10 is adhered strongly to the lens 30 solidly, the outside diameter of the metal ring 10 becomes the predetermined size finally after solidification of the lens 30, and the glass aspherical lens 1 having the metal ring can be mounted on the mounting member precisely.

Therefore, according to the present example, a small glass aspherical lens having a metal ring that is not only excellent in outside configuration and precision but also excellent in fixability on the mounting member by means of soldering can be formed easily.

(Other Embodiments)

Figure 5:
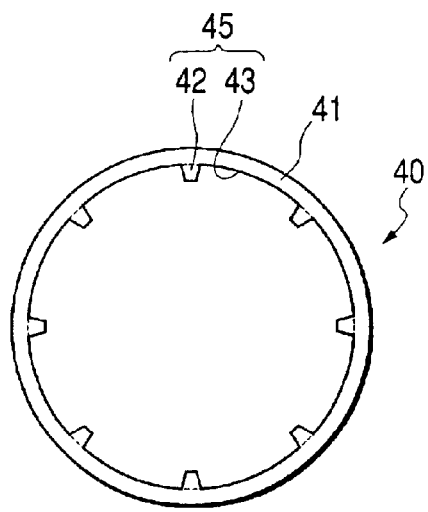
FIG. 5 is a bottom view showing a metal ring for an aspherical glass lens in accordance with another embodiment of the present invention.
Figure 6:
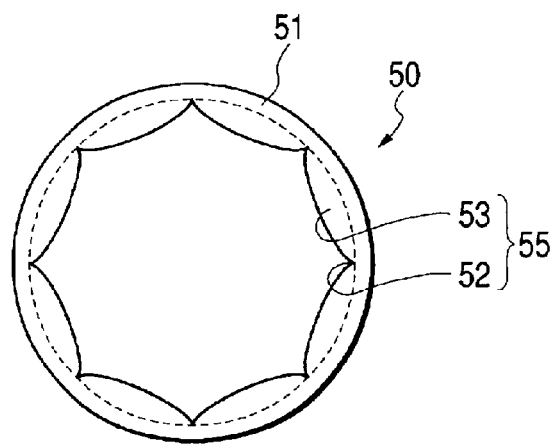
FIG. 6 is a bottom view showing a metal ring for an aspherical glass lens in accordance with another embodiment of the present invention.
Figure 7:
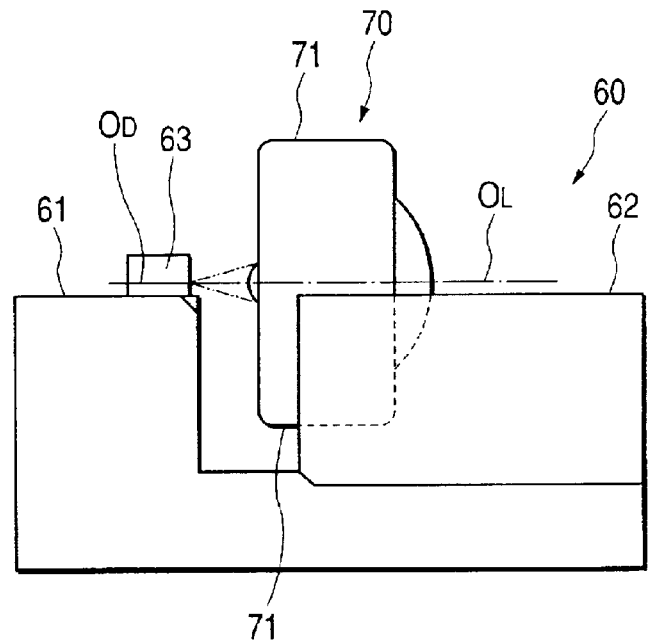
FIG. 7 is a front view showing a conventional aspherical glass lens together with a mounting member.
Figure 8:
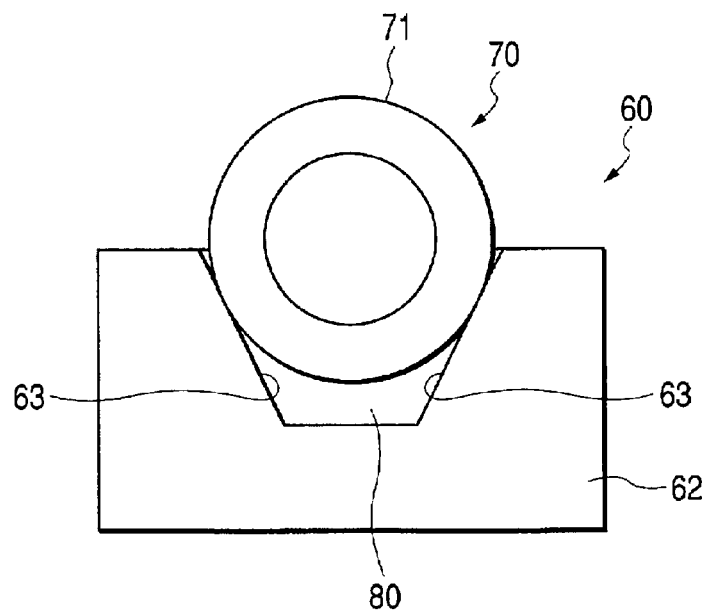
FIG. 8 is a side view showing the mounting member to which the aspherical glass lens shown in FIG. 7 is mounted.

Metal rings for optical element in accordance with other embodiments of the present invention will be described in FIG. 5 and FIG. 6. A metal ring 40, which is served as a holding portion 45, shown in FIG. 5 has eight projections as flanges 42 that extend in the inside direction from a thin-wall portion 43 having a thickness approximately equal to the thickness of a thin-wall sleeve 41. A metal ring 50, which is served as a holding portion 55, shown in FIG. 6 has eight arc projections as flanges 52 that extend in the inside direction from eight thin-wall portions 53 having an inside periphery in vicinity to which the inside peripheral surface of the thin-wall sleeve 41 extends.

By using the abovementioned metal ring, a small glass aspherical lens having a metal ring that is not only excellent in outside configuration and precision but also excellent in fixability on the mounting member by means of soldering can be formed easily as in the abovementioned embodiment.

Furthermore, that case in which softened pellet is pressed by use of the top force and the bottom force inside the metal ring when an optical element is formed is described, however otherwise, the present invention may be applied to the case in which an optical material member such as a lens that has been prepared previously is pressed to fit to a metal ring. In this case, the body die and the top and bottom forces are not used. Because the outside peripheral surface size is not defined by means of the body die, it is necessary that the size of a optical element member to be fit-pressed to the metal ring is set taking into consideration the size increase of the outside peripheral surface size due to the metal ring.

As described hereinabove, also by employing a method in which an optical element member is fit-pressed to a metal ring, a small glass aspherical lens having a metal ring that is not only excellent in outside configuration and precision but also excellent in fixability on the mounting member by means of soldering can be formed easily.

Furthermore, the exemplary cases in which a lens is used as the optical element are described in the abovementioned examples, however, other various optical elements such as prism, diffraction grating, laminated thin film optical element, and other optical elements may be used as the optical element.

As described hereinbefore, according to the present invention, the following excellent effects can be obtained. According to the present invention, when the diameter of the metal ring is expanded during molding, because the thin-wall portion is expanded when the diameter of the holding portion is expanded subsequent to the thin-wall sleeve, the diameter expansion resistance of the holding portion is mitigated so that the outside configuration of the holding portion and the portion around the holding portion are prevented from being deformed irregularly, and as the result the precision of the outside size is improved.

Furthermore, in the case of the present invention in which the holding portion having the edge potion provided with a polygonal aperture that is circumscribed to the inside periphery of the aperture is provided, because the portion between the polygonal side and the thin-wall sleeve is deformed more easily than the flange near the thin-wall portion located at the vertex of the polygon when the diameter of the holding portion is expanded, the diameter expansion resistance of the holding portion is mitigated so that the outside configuration of the holding portion and the portion around the holding portion is prevented from being deformed irregularly, and as the result the precision of the outside size is improved.

Furthermore, in the case where softened optical material is disposed inside the metal ring and the optical surface is formed by means of press working, the metal ring disposed on the periphery is expanded outward by means of the inside pressure when the optical material disposed in the metal ring is compressed by use of a die for forming the optical surface, the metal ring is pressed onto the inside configuration of the body die disposed outside, and a desired configuration is formed. At that time, because the thin-wall portion is expanded easily when the diameter of the holding portion is expanded subsequent to the thin-wall sleeve, the diameter expansion resistance of the holding portion is mitigated so that the outside configuration of the holding portion and the portion around the holding portion is prevented from being deformed irregularly, and as the result the precision of the outside size is improved.

Furthermore, in the case where the optical material member having the optical surface is fit-pressed inside the metal ring and the diameter of the thin-wall sleeve is expanded during fit-pressing, the metal ring disposed on the periphery is expanded outward by means of fit-pressing of the optical element member when the optical element member is fit-pressed inside the metal ring, the metal ring is pressed onto the inside configuration of the body die disposed outside, and thus a desired configuration is formed. At that time, because the thin-wall portion is expanded easily when the diameter of the holding portion is expanded subsequent to the thin-wall sleeve, the diameter expansion resistance of the holding portion is mitigated so that the outside configuration of the holding portion and the portion around the holding portion is prevented from being deformed irregularly, and as the result the precision of the outside size is improved.

What is claimed is:

1. A method for fabrication of an optical element having a metal ring in which the metal ring having a diameter slightly smaller than an inside diameter of a body die and an optical material are disposed inside the body die that is served to define a peripheral side surface configuration by which the optical element is positioned, and in which the optical material is pressed by a first mold to form a desired optically functional surface and the diameter of the metal ring is expanded toward the body die to obtain the optical element having the metal ring with a desired outside diameter, wherein the metal ring disposed inside the body die is provided with a thin-wall sleeve a diameter of which is expanded toward a peripheral direction by means of pressure received from an optical material disposed inside the metal ring to thereby obtain a final peripheral side surface size, a thin-wall portion having an inside periphery near an extension of an inside peripheral surface of the thin-wall sleeve on an aperture of the thin-wall sleeve, and a holding portion comprising a flange that projects from an edge of the aperture toward the aperture, wherein the holding portion has a space between the optical material and a second mold so that the optical material does not contact the mold when an unsoftened optical material is disposed, wherein an edge provided with a polygonal aperture that is circumscribed with an inside peripheral edge of the thin-wall sleeve is formed on the aperture of the metal ring, wherein a portion near a vertex of the polygonal aperture is made thin-walled, and wherein a portion between a polygonal side and the thin-wall sleeve is formed as the flange.

2. The method for fabrication of the optical element having the metal ring according to claim 1, wherein the optical element is a glass lens.

3. A method for fabrication of an optical element having a metal ring with a desired diameter in which an optical element member having a peripheral side surface configuration by which the optical element is postponed is fit-pressed inside the metal ring having a diameter slightly smaller than an outside diameter of the optical element member, and in which a diameter of the metal ring is expanded, wherein the metal ring is provided with a thin-wall sleeve a diameter of which is expanded radially by means of pressure received from an optical material disposed inside the metal ring to thereby obtain a final outside configuration size, a thin-wall portion having an inside periphery near an extension of an inside peripheral surface of the thin-wall sleeve on one aperture of the thin-wall sleeve, and a holding portion comprising a flange that projects from an edge of the aperture toward the aperture, wherein an edge provided with a polygonal aperture that is circumscribed with an inside peripheral edge of the thin-wall sleeve is formed on the aperture of the metal ring, wherein a portion near a vertex of the polygonal aperture is made thin-walled, and wherein a portion between a polygonal side and the thin-wall sleeve is formed as the flange.

4. The method for fabrication of the optical element having the metal ring according to claim 3, wherein the optical element is a glass lens.

* * * * *